(12) United States Patent
Broess et al.

(10) Patent No.: US 12,383,094 B2
(45) Date of Patent: Aug. 12, 2025

(54) PRODUCT CONTAINER INCLUDING A PRODUCT DISCHARGE DEVICE AND METHOD OF USE

(71) Applicant: FrieslandCampina Nederland B.V., Amersfoort (NL)

(72) Inventors: Alfonsus Wilhelmus Maria Broess, Wageningen (NL); Dirk Jan Bulsink, Wageningen (NL); Jacobus Constantijn Heijdenrijk, Wageningen (NL); Franciscus Johannes Knapen, Wageningen (NL)

(73) Assignee: FRIESLANDCAMPINA NEDERLAND B.V., Amersfoort (NL)

( * ) Notice: Subject to any disclaimer, the term of this patent is extended or adjusted under 35 U.S.C. 154(b) by 858 days.

(21) Appl. No.: 17/565,906

(22) Filed: Dec. 30, 2021

(65) Prior Publication Data

US 2022/0117436 A1      Apr. 21, 2022

Related U.S. Application Data

(63) Continuation of application No. PCT/NL2020/050432, filed on Jul. 1, 2020.

(30) Foreign Application Priority Data

Jul. 2, 2019  (EP) .................................... 19183832

(51) Int. Cl.
*A47J 31/44*         (2006.01)
*B65D 77/06*         (2006.01)
*B67D 3/04*          (2006.01)

(52) U.S. Cl.
CPC ......... *A47J 31/4485* (2013.01); *A47J 31/446* (2013.01); *A47J 31/4489* (2013.01); *B65D 77/067* (2013.01); *B67D 3/043* (2013.01)

(58) Field of Classification Search
CPC .. A47J 31/4485; A47J 31/446; A47J 31/4489; A47J 31/404; A47J 31/52; A47J 31/525; A47J 31/605; A47J 31/06
(Continued)

(56) References Cited

U.S. PATENT DOCUMENTS 5,680,970 A      10/1997  Smith et al.
2013/0213493 A1   8/2013  Samson
(Continued)

FOREIGN PATENT DOCUMENTS

JP       2004-099171 A      4/2004
WO       WO-2011/028117     3/2011
(Continued)

OTHER PUBLICATIONS

International Search Report and Written Opinion for PCT/NL2020/050432 mailed Nov. 4, 2020.

*Primary Examiner* — Phuong T Nguyen
(74) *Attorney, Agent, or Firm* — Sunit Talapatra; Foley & Lardner LLP

(57) ABSTRACT

A product container includes a product discharge device for releasing product from the container, the discharge device including a spout unit for discharge. The spout unit is rotatable, about a spout rotation axis, from a first position to an operational position. The spout unit preferably includes a handle for rotation from the first to the operational position, the handle preferably extending substantially radially outwardly from the axis; and a seal unit configured to enter an opened state, from a sealed state. In the latter, the seal unit is configured to substantially airtightly close off a flow-through channel of the discharge device, and, in the former, the seal unit is configured to allow flow through the flow-through channel. The discharge device is configured such that the seal unit can be brought from the sealed to the
(Continued)

opened state by rotating the spout unit from the first to the operational position.

29 Claims, 15 Drawing Sheets

(58) Field of Classification Search
USPC .................. 99/279, 285, 293, 294, 295, 304
See application file for complete search history.

(56) References Cited

U.S. PATENT DOCUMENTS

| | | |
|---|---|---|
| 2017/0273500 A1 | 9/2017 | Botman et al. |
| 2019/0152657 A1* | 5/2019 | Darby .................. B65D 77/065 |

FOREIGN PATENT DOCUMENTS

| | | |
|---|---|---|
| WO | WO-2016/043590 A1 | 3/2016 |
| WO | WO-2019/053210 | 3/2019 |

* cited by examiner

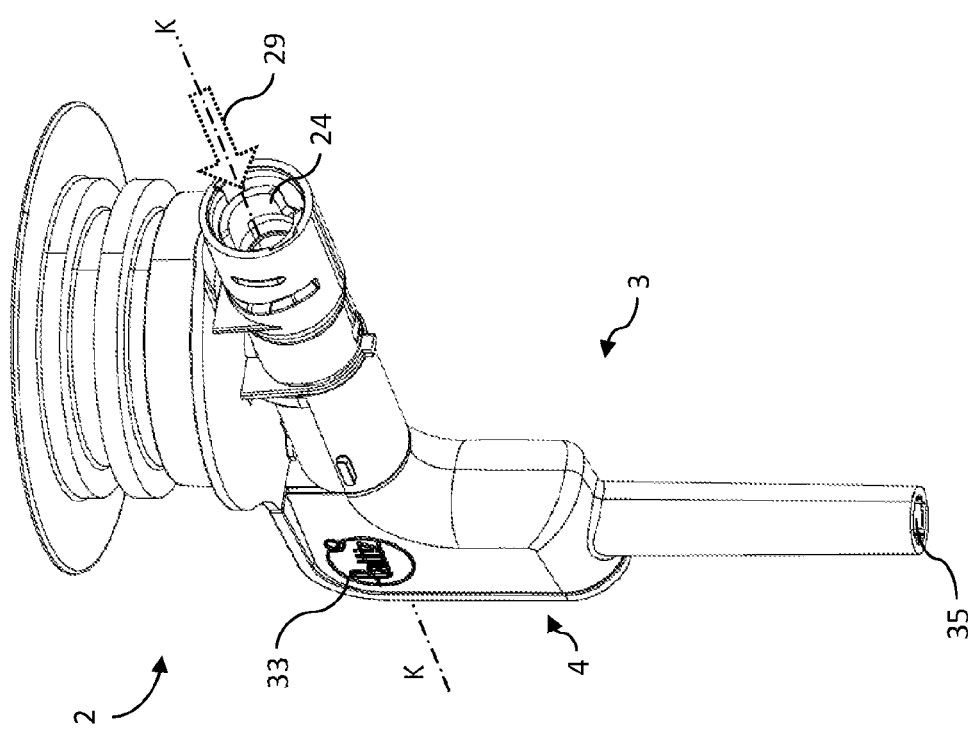
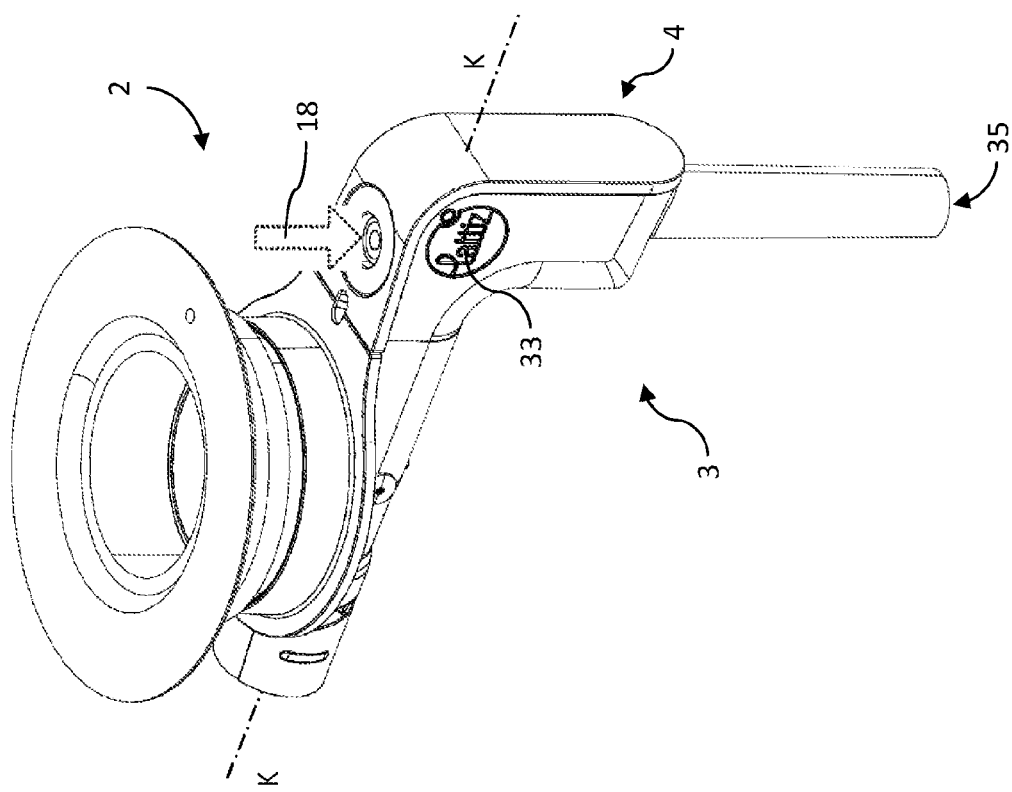

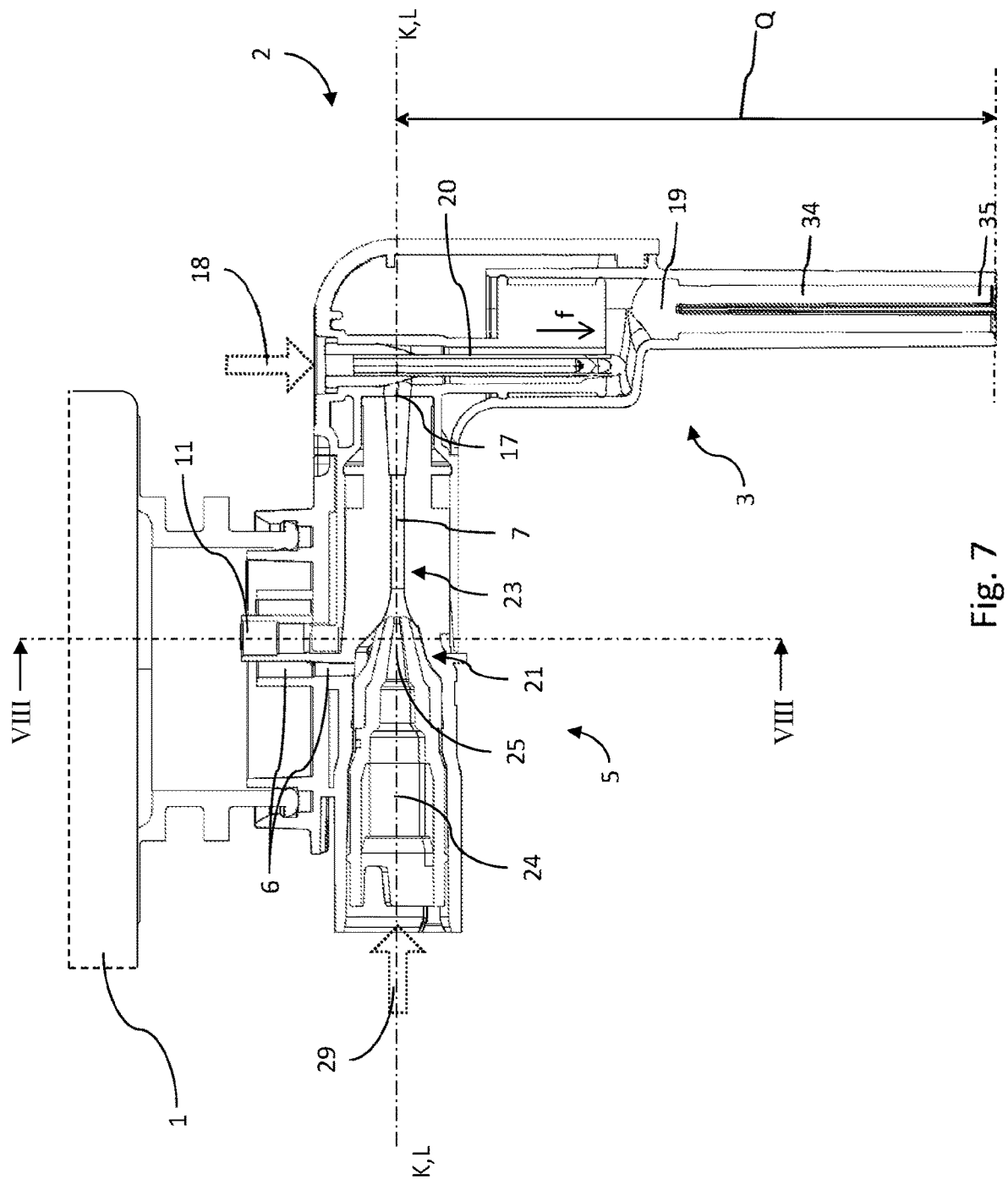

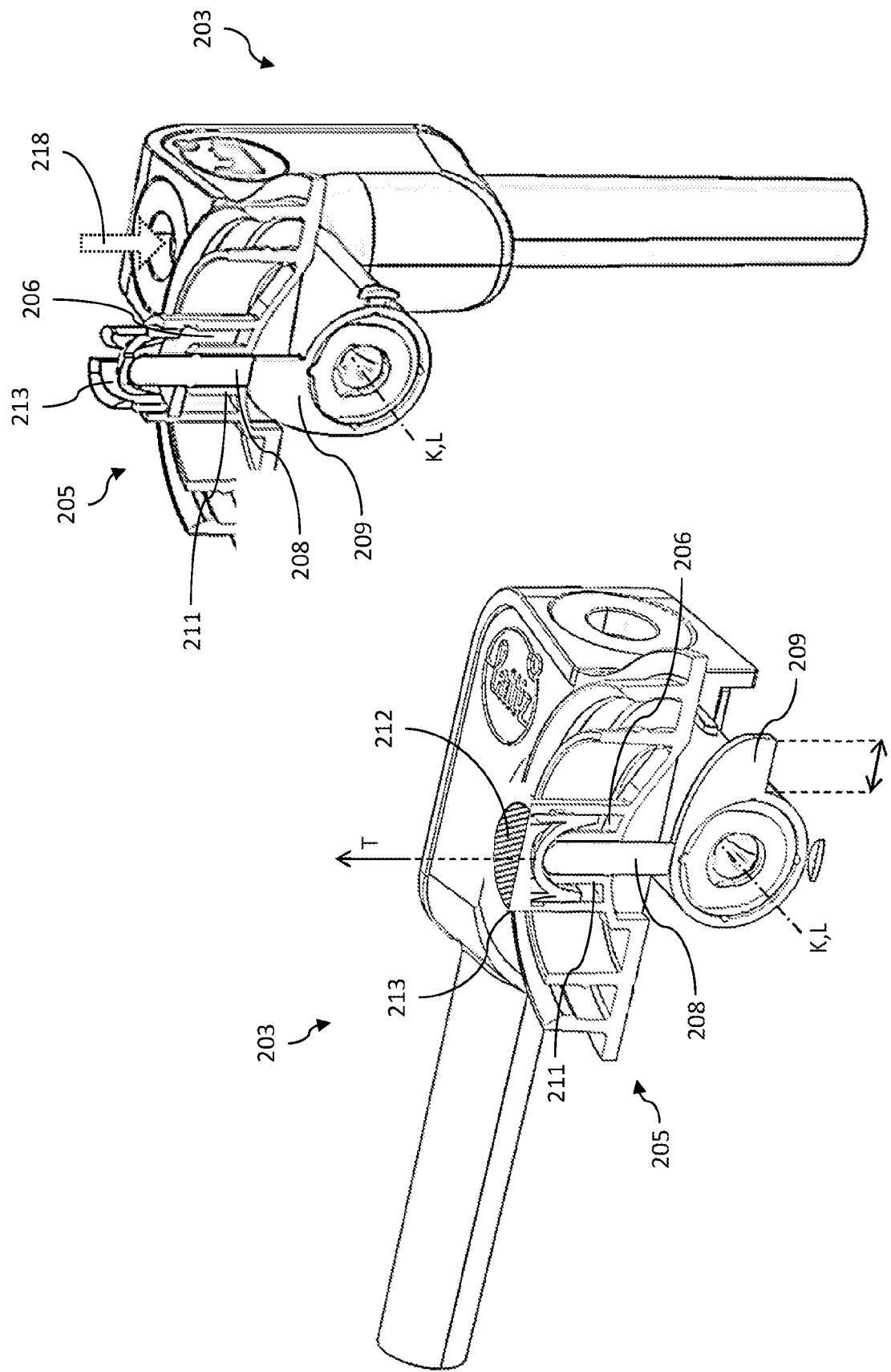

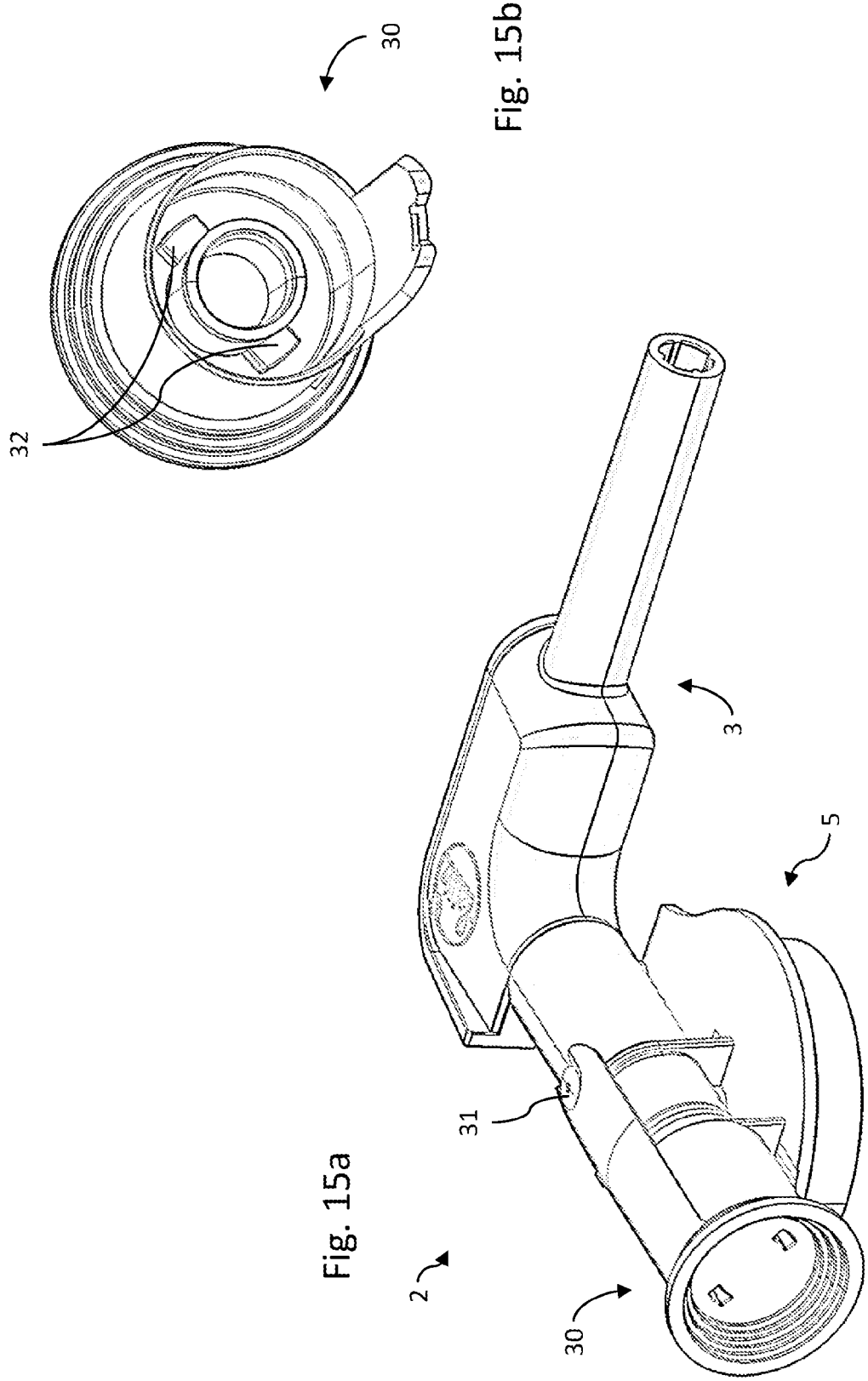

PRODUCT CONTAINER INCLUDING A PRODUCT DISCHARGE DEVICE AND METHOD OF USE

CROSS-REFERENCE TO RELATED APPLICATIONS

The present application is a continuation application of PCT/NL2020/050432 filed Jul. 1, 2020, which claims priority to European Patent Application No. 19183832.5 filed Jul. 2, 2019, the entire contents of which are incorporated herein by reference.

FIELD

The present invention concerns a product container.

BACKGROUND

The present invention concerns a product container, in particular for a food product, wherein the product container includes a product discharge device for releasing product from the container.

Such a product container is known from practice and sold by the applicant as part of the Lattiz® system. The known product container includes a flexible bag for containing the product. The product may be, for example, a liquid food product or a concentrate thereof, e.g. a milk concentrate. The discharge device includes a valve member or the like for controllably releasing product from the container.

The discharge device of the known container includes a spout unit for spouting product, wherein the spout unit is rotatable from a first position, e.g. a transport position, to an operational position, wherein, in the operational position, compared to the first position, the spout unit extends further outwardly from a bottom side of the container. In this way, product can be spouted substantially at a distance from the container, while the container may be transported compactly, safely and easily when the spout unit is in the first position.

In order to protect a contained product from environmental threats such as bacteria before use (e.g. during transport and storage), the discharge device includes an openable seal unit which is configured to airtightly close off an interior product-containing space of the container from a downstream part of the discharge device. It is generally desired that accidental opening of the seal unit, e.g. during transport, is prevented. It is further desired that the seal unit is easily openable by a user to enable initial release of product, e.g. at a desired time.

It has been found difficult to satisfy competing requirements of preventing accidental seal opening and enabling easy opening by a user. For example, the seal units should not be hard to open by a user. Excessive force required for releasing or breaking a seal unit structure should be prevented. The seal unit may also be poorly accessible by the user. Further, the user's efforts in opening the seal unit should not accidentally damage the product container and/or have other unintended disadvantageous consequences.

US2019/0152657A1 discloses a dispensing assembly for a liquid container which container has an opening configuration with a resilient membrane with an opening therein which in a rest position will automatically close, but can be urged to an open position providing access to the interior of the container.

WO2019/053210A1 discloses a system for aerating a liquid food product, wherein the system comprises a bubble generator for generating bubbles in a liquid food product flow.

US2013/0213493A1 discloses a tapping device for at least one "bag-in-box" packaging, which is equipped with a tap valve, comprising at least one accommodating area for the "bag-in-box" packaging.

US2017/0273500A1 discloses an eductor suitable for use in an assembly for preparing a liquid product.

SUMMARY

In general, it is desired to provide a product container which is easy to use, in particular requiring minimal user effort to handle and operate the container, in particular requiring a minimal number of user actions. Also, reliable seal opening is desired, as well as a durable seal.

It is therefore an object of the invention to provide an improved product container, in particular for a food product, wherein the container can be used efficiently, easily, safely and reliably by a user, wherein the container can be transported compactly and wherein a product contained in the container may be protected from environmental threats such as bacteria, at least before initial use.

Therefore, there is provided a product container, in particular for a food product, wherein the product container includes a product discharge device for releasing product from the container, the discharge device comprising: a spout unit for product discharge, wherein the spout unit is rotatable, about a spout rotation axis, from a first (idle) position to an operational position, wherein the spout unit preferably includes a handle for rotating the spout unit from the first position to the operational position, wherein the handle preferably extends substantially radially outwardly from the spout rotation axis; and a seal unit which is configured to enter an opened state, from a sealed state, wherein, in the sealed state, the seal unit is configured to substantially airtightly close off a first product flowthrough channel of the discharge device, wherein, in the opened state, the seal unit is configured to allow a flow of product through the first product flowthrough channel, wherein the discharge device is configured such that the seal unit can be brought from the sealed state to the opened state by rotating the spout unit from the first position to the operational position.

Using the spout unit in the first position, the container can be transported compactly. Using the spout unit in the operational position, product can be spouted from the container in a respective spout unit discharge direction (e.g. into a product receiver, a cup or the-like). The seal unit provides protection of a product contained in the container from environmental threats such as bacteria. A single easy user action, i.e. a rotation of the spout unit, provides for bringing the spout unit to the operational position, as well as for opening the seal unit in an easy, well-controlled and reliable way. The container can thus be used efficiently, easily, safely and reliably by a user. It is preferred that a movement (i.e. rotation) of the spout unit with respect to a remaining part of the container is mechanically transmitted or translated into the opening of the seal unit, in particular by mechanical transmission means (as follows from embodiments explained below).

The spout rotation axis preferably substantially coincides with a central axis of a (e.g. substantially tubular) second product flowthrough channel of the discharge device which is downstream of the first product flowthrough channel and which preferably extends from the seal unit into the spout unit.

This allows for efficient manufacturing. Also, in this way, leaking of the said product flowthrough channel can be prevented.

The first position of the spout unit and the operational position of the spout unit may differ by an angle of rotation about the spout rotation axis of between 10 and 275 degrees, preferably between 30 and 185 degrees, preferably between 45 and 130 degrees, preferably between 70 and 110 degrees, preferably about 90 degrees. For example, in the operational position, compared to the first position, the spout unit preferably extends substantially further outwardly from a side of the product container.

Such an angle of rotation can enable that the above mentioned advantages of the first and the operational position can be provided while a rotation from the first to the operational position can be easily realized by a user.

Mechanical transmission of spout unit rotation can be achieved in various ways. For example, in a preferred embodiment, the discharge device is configured to convert a rotation of the spout unit, from the first position to the operational position, to a respective translation of a follower element, wherein the seal unit is configured to enter the opened state, from the sealed state, by the translation of the follower element, wherein a direction of the translation of the follower element preferably extends substantially radially outwardly from the spout rotation axis.

Such a configuration can provide a robust and simple solution for converting a rotation to a translation, wherein the translation may affect the opening of the seal unit.

The spout unit may include a cam, in particular a disk cam, for bringing the seal unit from the sealed state to the opened state, wherein the cam is rotatable about the spout rotation axis by a rotation of the spout unit about the spout rotation axis.

In this way, a relatively simple and robust transmission is provided.

The seal unit may include a plug, which, in the sealed state, is received by a shaft of the seal unit to substantially airtightly close off the first product flowthrough channel of the discharge device, wherein the seal unit is configured such that the plug is at least partially removable from the shaft to bring the seal unit to the opened state.

Advantageously, in such an embodiment, a simple and robust solution is provided wherein a reliable seal unit can be easily manufactured, e.g. using injection molding.

The seal unit may include a cuttable seal material for substantially airtightly closing off the first product flowthrough channel of the discharge device, wherein the seal unit includes a cutter for cutting the seal material, wherein the seal unit is configured such that the cutter is cuttingly movable through the seal material.

In such an embodiment, advantageously, a reliable and durable sealing solution is combined with user friendly and reliable means for opening, i.e. breaking the seal, i.e. the cuttable seal material.

The discharge device may be configured to convert an actuation of the cutter, e.g. received from the spout unit, to a substantially helical movement of the cutter, wherein the seal unit includes an engaging structure for engaging with a respective engaging structure of the cutter, wherein at least one of the mutual engaging structures includes a substantially helical profile, e.g. a spindle thread or the like.

The helical movement of the cutter can ensure a smooth and substantially complete cutting of the cuttable material (as opposed to for example a puncturing or tearing of the material).

The spout unit may include a microfiltration device which is provided with a product entrance for supply of product, wherein the microfiltration device is connectable to a fluid supply (i.e. gas supply) for supplying gas, for example air, to the product during product discharge, wherein the spout unit preferably includes a processing device which is arranged downstream of said microfiltration device, for performing a mixing treatment and/or pressure reduction treatment on the product provided with gas, wherein the spout unit preferably includes the microfiltration device, wherein the microfiltration device is preferably provided with a filtration wall with gas transmissive pores having a pore size in the range of 0.1-10 microns, in particular a pore size of at least 0.1 micron and less than 2 microns, wherein a length of the filtration wall is preferably at most 5 cm, and more particularly is in the range of approximately 0.5-5 cm, for instance, approximately 2 cm, measured in a product flow direction of product during use flowing along that wall, parallel to that wall, wherein the pore size is preferably in the range of 0.2 micron to 1.5 microns.

It has been found that a homogeneously foamed product can be obtained using the configuration described above.

The product container may be configured to be exchangeably received by a dispensing machine.

In this way, advantageously, a substantially empty (used-up) container may be replaced by a fresh, product filled container, so that the respective dispensing machine can be used multiple times.

The discharge device may include a mixing device upstream of the microfiltration device, wherein the mixing device is configured to mix a diluent, preferably water, into the product, wherein the mixing device is connectable to a diluent supply for receiving the diluent.

With such a configuration, a volume of discharged product may be increased and/or a concentration of one or more product ingredients may be lowered. For example, the product container may contain a product concentrate so that efficient transport and storage is provided.

The mixing device may be configured such that supplying the diluent to the mixing device causes product to be pumped into the mixing device, wherein the mixing device preferably includes a flow constriction in a flow path of the diluent to form an aspirator pump for pumping product into the mixing device.

In this way a relatively simple and robust configuration is obtained wherein multiple functions (supplying diluent and pumping product) are combined. In particular, by integrating these functions, a relatively stable and predictable ratio of supplied diluent to pumped product can be obtained.

The mixing device may include a valve member for selectively blocking a flow of product into the mixing device, wherein the valve member is movable between a blocking state, wherein a flow of product is blocked, and a passage providing state, wherein a passage for flow of product into the mixing device is provided.

Such a valve member can thus be used to selectively block a flow of product through the discharge device, in particular through the mixing device.

The valve member preferably includes a diluent flow-through channel for conveying a flow of diluent through the valve member, wherein the valve member is preferably connectable to the diluent supply, wherein the valve member is preferably movable by the diluent supply.

In this way, the valve actuator may actuate the valve member through actuation of the diluent supply, in particular through actuation of a connector of the diluent supply. Such a configuration can advantageously reduce the number of connections to the discharge device and can provide a compact and robust system. As a further advantage, diluent may thus be supplied to and/or through the discharge device substantially regardless of the state of the valve member, so that for example a downstream part of the discharge device may be flushed with diluent, e.g. for cleaning the said downstream part.

The spout unit may include a handle, in particular a twist handle, for rotating the spout unit from the first position to the operational position, wherein the handle extends more than 1 cm, preferably more than 2 cm, more preferably at least 4 cm (for example at least 5 or at least 6 cm) radially outwardly from the spout rotation axis.

Such a handle provides means for a user to overcome a resistance of a rotation of the spout unit, in particular by providing a lever in the form of the handle.

The spout unit may include an outlet channel for conveying product to a product outlet of the spout unit, wherein the outlet channel extends substantially in the direction in which the handle extends.

In this way, a compact and efficient configuration is provided, wherein the advantages of spouting product at a distance from a side of the product container and providing a lever for rotating the spout unit are combined in a compact way.

The discharge device may be configured such that an angular position of the spout unit about the spout rotation axis is substantially limited to angular positions ranging from the first position up to and including the operational position.

Such a configuration can limit the possibility of failures during transport and use.

The discharge device may be configured such that when the spout unit is in the operational position, the position of the spout unit is substantially fixed in the operational position.

This can prevent that a discharge device wherein the seal unit is opened may be visually confused for a device wherein the seal unit is in the sealed state. This can help to further improve safe handling of the product, in particular to improve food safety.

The discharge device may be provided with a transport lock which is configured to lock, e.g. clamp, the spout unit substantially in the first position, wherein the transport lock is preferably manually removable, e.g. pullable, from the discharge device.

Such a transport lock may thus provide additional protection of the discharge device during transport.

The discharge device may be configured to provide user feedback, preferably haptic user feedback, upon the spout unit leaving the first position, wherein, preferably, the discharge device is further configured to provide user feedback, preferably haptic user feedback, upon the spout unit reaching the operational position.

Such user feedback can provide additional ease of use and safety by guiding the user in proper usage of the device.

The discharge device may be configured such that the cam engages the follower element for bringing the seal unit from the sealed state to the opened state.

In this way, a relatively simple and robust transmission is provided.

The discharge device may be configured such that the cam engages the plug for bringing the seal unit from the sealed state to the opened state.

In this way, a relatively simple and robust transmission is provided.

The cam of the spout unit may have a stroke of between 1 and 6 mm, preferably between 2 and 4 mm, for example about 3 mm, in particular when the seal unit includes a plug.

In this way, a relatively simple and robust transmission is provided.

The seal unit may be configured such that the cutter is cuttingly movable through the seal material by the translation of the follower element, wherein the follower element is preferably configured to engage the cutter, wherein the cam of the spout unit preferably has a stroke of between 2 and 10 mm, preferably between 4 and 8 mm, for example about 6 mm.

In such an embodiment, advantageously, a reliable and durable sealing solution is combined with user friendly and reliable means for opening, i.e. breaking the seal, i.e. the cuttable seal material.

The invention also provides a combination of the product container described herein and a product dispensing machine configured to receive the product container and to cooperate with the product container for discharging product from the container, wherein in particular the product container is received by the product dispensing machine. The machine preferably includes at least one, more preferably two, more preferably all of: a fluid supply for supplying gas, for example air, preferably at a superatmospheric pressure, to the product discharge device; a diluent supply for supplying a diluent, preferably water, preferably at a temperature above room temperature, to the product discharge device; and a valve actuator for moving a valve member of the product discharge device.

Such a product dispensing machine in such a combination can advantageously be used to dispense product, in particular foamed product, for example foamed diluted product concentrate, from the product container. Reliable and efficient operation of the machine is provided by the features of the product container described above.

The invention also provides a method for bringing a seal unit of a product discharge device of a product container from a sealed state to an opened state, the method comprising: providing a product container wherein the seal unit is in the sealed state and the spout unit is in the first position; and rotating the spout unit about the spout rotation axis, from the first position to the operational position, thus bringing the seal unit from the sealed state to the opened state.

Such a method provides the advantages described above. Further advantageous elaborations of the invention are provided by the features of the dependent claims.

BRIEF DESCRIPTION OF THE DRAWINGS

The invention will be explained further with reference to exemplary embodiments and drawings. In the drawings:

FIG. 6a shows a perspective view of the product discharge device of FIG. 4;

FIG. 6b shows a perspective view of the product discharge device of FIG. 6a with a different point of view compared to FIG. 6a;

FIG. 7 shows a cross-section of a product discharge device according to a further embodiment, wherein a follower element is not shown;

FIG. 9a shows an opened view of the spout unit of FIG. 8a;

FIG. 9b shows a partial perspective view of the spout unit of FIG. 8a;

FIG. 10b shows an opened view of the plug of the seal unit of FIG. 10a;

FIG. 11a shows an opened view of a product discharge device including a cutter, wherein a spout unit is in a first position and a seal unit is in a sealed state;

FIG. 11b shows an opened view similar to FIG. 11a, wherein the spout unit is in an operational position and the seal unit is in an opened state;

FIG. 12a shows an opened view of the spout unit of FIG. 11a;

FIG. 12b shows a partial perspective view of the spout unit of FIG. 11a;

FIG. 14a shows a perspective view of the cutter of the seal unit of FIG. 11a;

FIG. 14b shows a perspective view of the follower element of the seal unit of FIG. 11a;

FIG. 15a shows a perspective view of a product discharge device provided with a transport lock;

FIG. 15b shows a perspective view of the transport lock of FIG. 15a.

Figure 1:
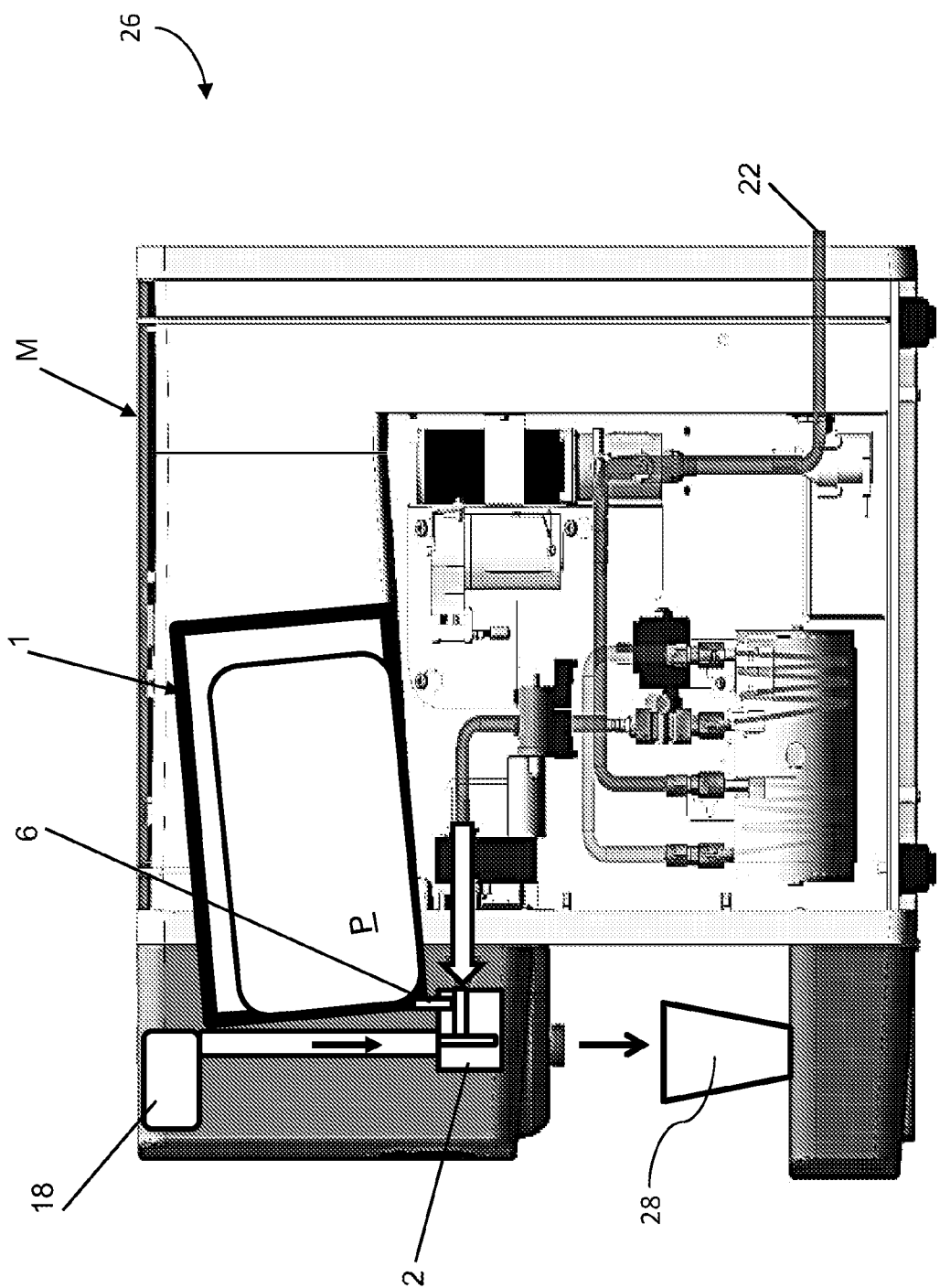
FIG. 1 shows a schematic cross-section of a product dispensing system.

In the drawings, similar or corresponding features are indicated with similar or corresponding reference signs.

DETAILED DESCRIPTION

FIG. 1 shows an exemplary product dispensing system 26 which comprises a machine M and a replaceable container 1 having a product discharge device 2 for releasing product from the container 1. The system 26 may be configured such that a receptacle 28, e.g. a cup or a jar, may be placed near, preferably under the discharge device 2 for receiving dispensed product from the discharge device 2 into the receptacle 28. The dispensed product may be a food product, for example a foamed food product, for example a foamed dairy product, for example foamed milk. It will be appreciated that the invention may be carried out with other products, and that products may be foamed or not foamed.

FIG. 1 schematically shows an example of a product dispensing system 26, described per se in PCT/NL2010/ 050556 (published as WO/2011/028117 on Mar. 10, 2011 and having counterpart U.S. national stage application publication US 2012/0269945 A1 which published Oct. 25, 2012, and which is incorporated by reference in its entirety in the present patent application, including for the devices and methods disclosed therein), the system 26 comprising a holder/container 1 which contains a product P to be dispensed, and product discharge means 6 (for instance, provided with a product discharge channel) for discharging product P coming from the container 1. A system corresponding or similar to that of FIG. 1 may be utilized, for instance, in a dispensing system as will be described below, in which case the product processing means are integrated with the holder (i.e. container) as a "product processing unit CPU", i.e. a product discharge device 2.

The holder/container 1 can be designed and formed in different manners. For instance, an outer wall of the holder 1 can be manufactured from, for instance, metal, an alloy, plastic, or the like. The outer wall can be of rigid or flexible design. The container 1 may be, for instance, of cylindrical or angular design, or of different design. In a preferred embodiment, the container is a bag-in-box type holder, wherein the product is held in a flexible bag that is located within an external enclosure (box).

The container 1 can be designed, for instance, to withstand a maximum internal pressure of 12 bar, in particular 10 bar, for instance, if the container 1 is provided with a propellant (see hereinbelow). According to an advantageous embodiment, the container 1 is designed to withstand a considerably lower maximum pressure, for instance, at most 2 bar, so that the container can be of relatively light (and, for instance, relatively simple, inexpensive) design (such as the bag-in-box design).

According to an advantageous elaboration, the product P present in the container is a homogeneously foamable product, and in particular a food product, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, juice, more particularly a milk product. The product P can be, for instance, cream.

The product can be e.g. a mixture of products, for example of a mixture of a number of the afore-mentioned products, a mixture of one of the aforementioned products with a liquid (e.g. water), a mixture of a concentrated product (e.g. concentrated milk) and a liquid (e.g. water), or a different mixture. In order to obtain such a mixture, various product containers may be available for providing respective products to be mixed, before being fed to a downstream part of the system (i.e. to the product discharge means 6). Alternatively, for example, the system can a product container 1 as well as include one or more liquid supplies (e.g. a diluent supply 22, e.g. a water supply) for achieving a product/liquid-mixture, to be fed to the discharge means.

The product P can optionally contain, for instance, a propellant or blowing agent (for instance, in a condition at least partly dissolved in the product), in particular a propellant consisting of one or more of: air, N2, N2O and/or CO2. Such a propellant or blowing agent is, in particular, safe with regard to food technology. The propellant or blowing agent can hold an inner space of the container 1, for instance, at a particular superatmospheric prepressure.

Furthermore, the product P may comprise, for instance, no homogeneously foamable and/or consumable product P.

The system may include a dispensing machine M, configured for receiving an exchangeable product container 1. In this example, the product container 1 is a bag-in-box type holder, wherein the product P is held within a flexible bag located within a box 1. The dispensing machine M includes e.g. a product container receiving bay for receiving and holding the container 1 in the depicted operating position.

The container 1 e.g. includes a product outlet, i.e. a first product flowthrough channel 6, for feeding product P from the bag to a downstream product processing unit 2. The processing unit 2 can be integrally connected to the respective product container 1, in particular to be installed and (after use) removed from the machine M together with the product container 1.

The product processing unit 2 is configured for processing and discharging product coming from the container 1, in particular for injecting gas into the product P.

The product container 1 may contain a product concentrate, for example milk concentrate, wherein the system 26 is configured to dilute the product concentrate during the dispensing. To this end, the system 26 may include a diluent supply 22 for supplying a diluent, preferably water, preferably at a temperature above room temperature, to the product discharge device 2, in particular to a mixing device 21 of the discharge device 2, wherein the discharge device 2, in particular the mixing device 21, is configured to mix the diluent with the product concentrate to dilute the product concentrate.

Figure 2:
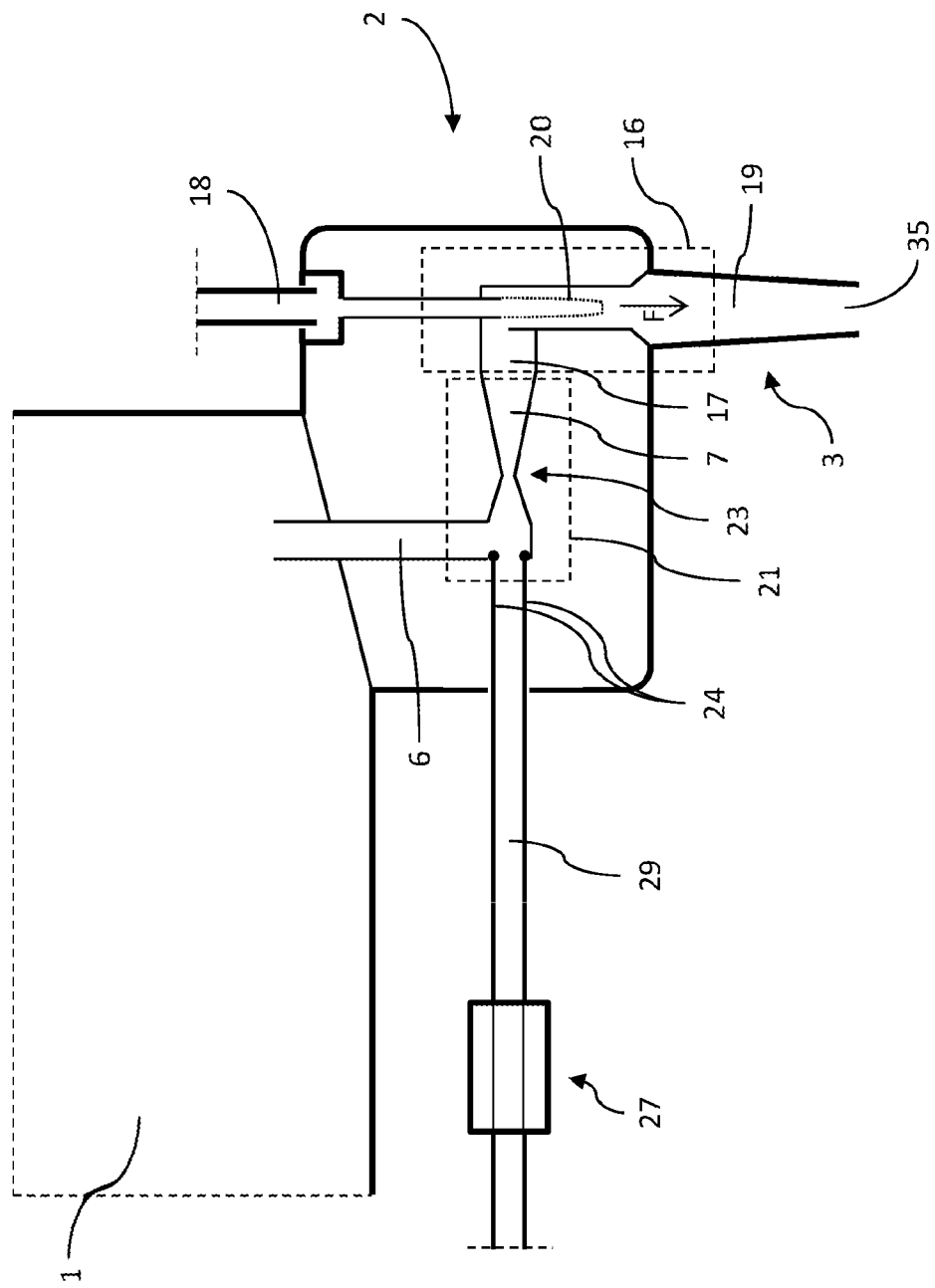
FIG. 2 shows a schematic cross-section of a detail of the product dispensing system of FIG. 1, in particular including a product discharge device, wherein a valve member is in an opened state.
Figure 3:
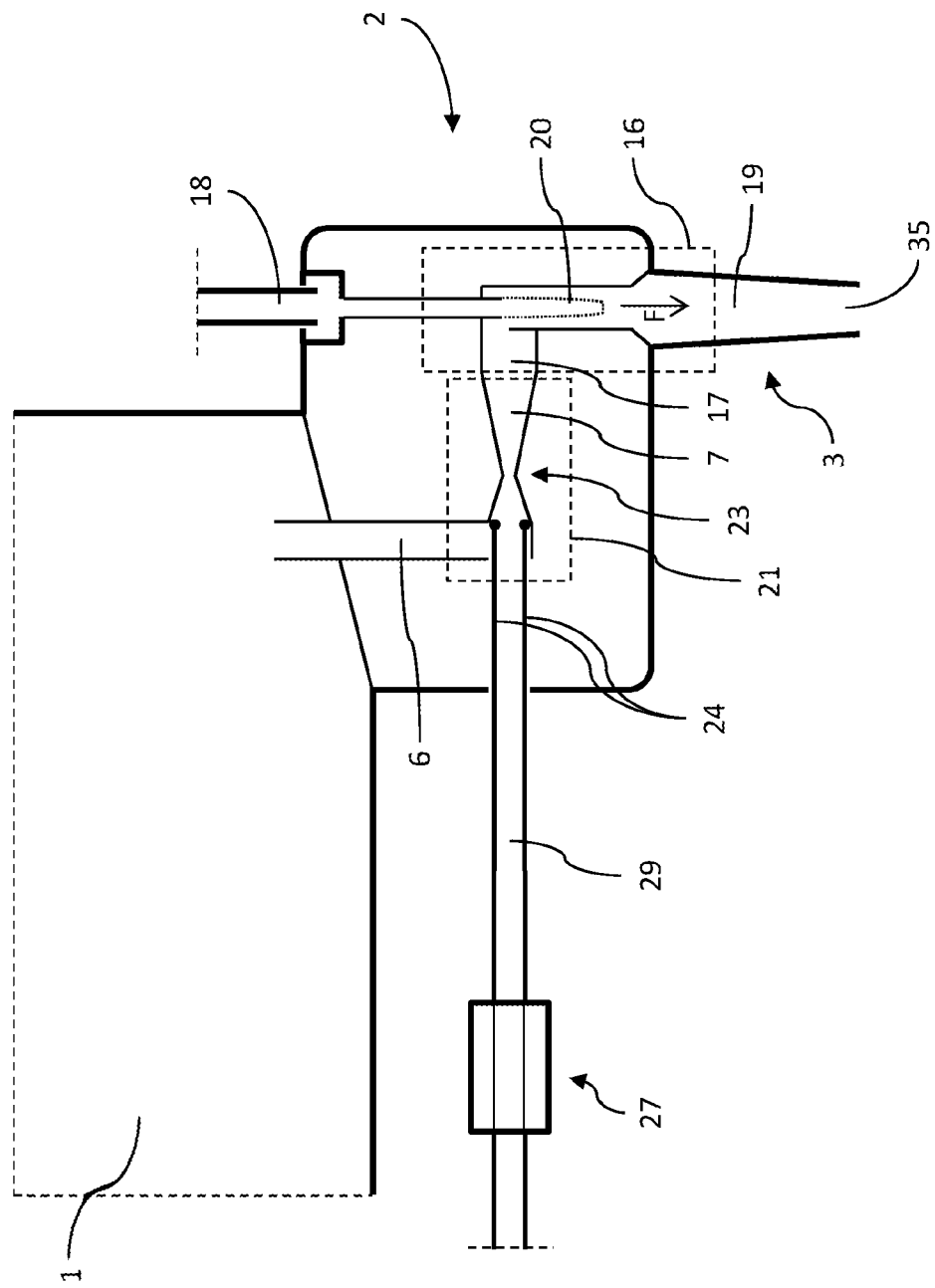
FIG. 3 shows a schematic cross-section similar to FIG. 2, wherein the valve member is in a flow blocking state.
Figure 4:
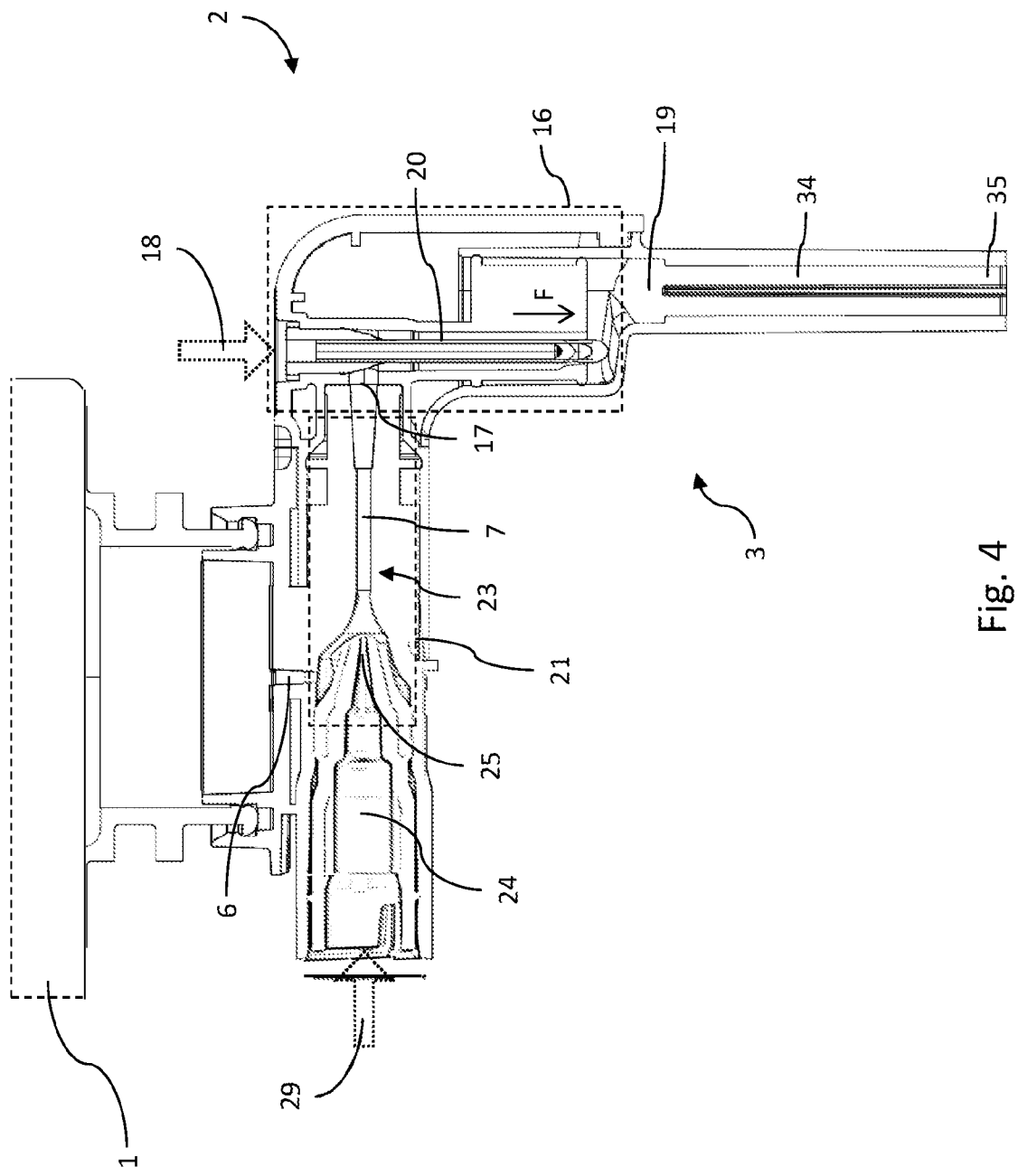
FIG. 4 shows a cross-section of the product discharge device in more detail, wherein the valve member is in an opened state.
Figure 5:
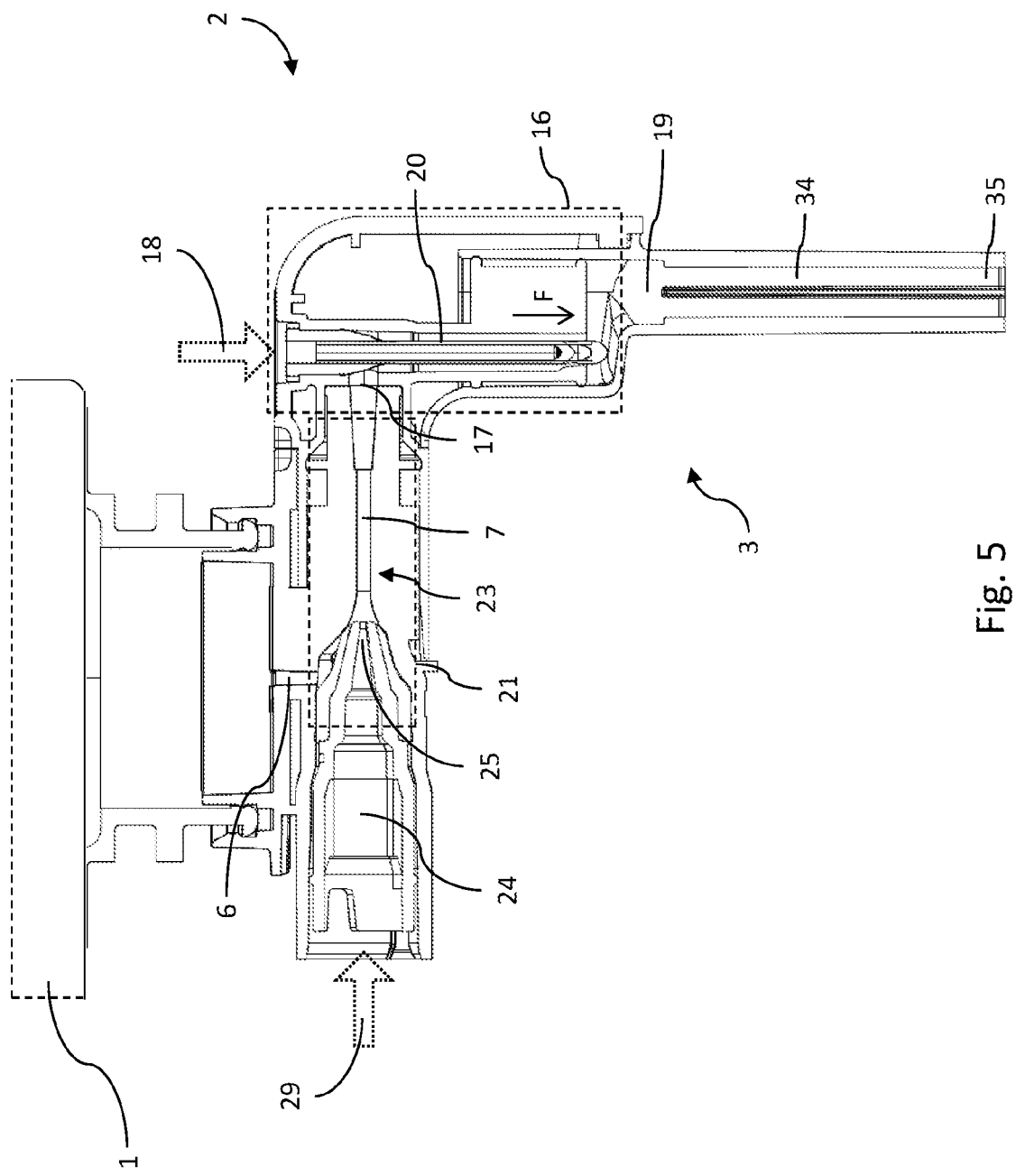
FIG. 5 shows a cross-section similar to FIG. 4, wherein the valve member is in a blocking state.

The system may include a valve actuator 27 for moving a valve member 24 of the discharge device 2, in particular of the mixing device 21, through an actuation, e.g. a rotary actuation, of the diluent supply 22, for controllably closing off a first product flowthrough channel 6 of the discharge device 2. To this end, the valve member 24 may be movable between a passage providing state (see FIGS. 2, 4), wherein a passage for flow through the first flowthrough channel 6 is provided, and a blocking state (see FIGS. 3, 5), wherein a flow of product is blocked. Such a valve member 24 can thus be used to selectively block a flow of product through the discharge device 2, in particular through the mixing device 21.

The valve member 24 preferably includes a diluent flowthrough channel 25 for conveying a flow of diluent through the valve member 24, wherein the valve member 24 is preferably connectable to the diluent supply 22 and preferably movable by the diluent supply 22.

In this way, the valve actuator 27 may actuate the valve member 24 through actuation of the diluent supply 22, in particular through actuation of a connector 29 of the diluent supply 22. Such a configuration can advantageously reduce the number of connections to the discharge device 2 and can provide a compact and robust system 26. As a further advantage, diluent may thus be supplied to and/or through the discharge device 2 substantially regardless of the state of the valve member 24, so that for example a downstream part of the discharge device 2 may be flushed with diluent, e.g. for cleaning the said downstream part.

The discharge device 2, in particular the mixing device 21, is preferably configured such that product may be pumped into the discharge device 2, in particular into the mixing device 21, from the container 1, by a supply of diluent to the discharge device 2, wherein the diluent is preferably supplied at superatmospheric pressure. To this end, the mixing device 21 preferably includes a flow constriction 23 in a flow path of the diluent (in particular in the second flowthrough channel 7) to form an aspirator pump for pumping product into the mixing device 21, in particular through the first flowthrough channel 6.

The exemplary system 26 further includes a fluid supply 18 for supplying gas, for example air, to the product during product discharge, in particular for foaming and/or frothing the product, e.g. the diluted product concentrate. To this end, the discharge device 2 may include a microfiltration device 16, preferably positioned downstream of the mixing device 21, wherein the microfiltration device 16 is provided with a product entrance 17 for supply of product. The microfiltration device 16 is preferably connectable to the fluid supply 18 for receiving gas, for example air, therefrom.

The microfiltration device 16 is preferably provided with a filtration wall 20 having gas transmissive pores. Fluid, e.g. air, may be introduced into the product through the filtration wall 20 as product flows along the wall 20, wherein the fluid is supplied from the fluid supply 18 at preferably superatmospheric pressure.

The gas transmissive pores may have a pore size in the range of 0.1-10 microns, in particular a pore size of at least 0.1 micron and less than 2 microns, wherein a length of the filtration wall is at most 5 cm, and more particularly is in the range of approximately 0.5-5 cm, for instance, approximately 2 cm, measured in a product flow direction F of product during use flowing along that wall, parallel to that wall, wherein the pore size is preferably in the range of 0.2 micron to 1.5 microns.

A processing device 19 may be provided downstream of the microfiltration device 16 for processing the foamed product, for performing a mixing treatment and/or pressure reduction treatment on the product provided with gas, i.e. the foamed or frothed product.

It has been found that a homogeneously foamed product can be obtained using the configuration described above.

The product discharge device 2 may include a spout unit 3 for product discharge. The spout unit 3, which may include the microfiltration device 16 and/or the processing device 19, may be rotatable about a spout rotation axis K between a first position and an operational position. The spout rotation axis K preferably coincides with a center line L of a product flowthrough channel which extends into the spout unit 3, for example the second product flowthrough channel 7. In this way, leaking of the said product flowthrough channel can be prevented.

To enable easy manual rotation of the spout unit 3, the spout unit 3 preferably includes a handle 4 (see FIGS. 6a-b) which preferably extends substantially radially outwardly from the spout rotation axis K. The handle 4 may include one or more profiled surfaces 33 for providing improved grip of the handle 4 to a user.

The first position of the spout unit 3 may be a transport position (see FIGS. 8a, 11a, 15a), wherein the product container 1 including the discharge device 2 has a more compact form compared to when the spout unit 3 is in the operational position (see FIGS. 4-7, 8b, 11b). For example, in the operational position, compared to the first position, the spout unit 3 may extend substantially further outwardly from a side of the product container 1.

The first position of the spout unit 3 and the operational position of the spout unit 3 may differ by an angle of rotation about the spout rotation axis K of between 10 and 275 degrees, preferably between 30 and 185 degrees, preferably between 45 and 130 degrees, preferably between 70 and 110 degrees, preferably about 90 degrees.

Such an angle of rotation can enable that the above mentioned advantages of the first and the operational position can be provided while a rotation from the first to the operational position can be easily realized by a user.

The spout unit 3 may include a handle 4, in particular a twist handle 4, for rotating the spout unit 3 from the first position to the operational position, wherein the handle 4 extends more than 1 cm, preferably more than 2 cm, radially outwardly from the spout rotation axis K (over a distance indicated by arrow Q in FIG. 7).

Such a handle provides means for a user to overcome a resistance of a rotation of the spout unit 3, in particular by providing a lever in the form of the handle. It has been found that good results can be achieved in case the handle 4 extends at least about 4 cm, for example at least 5 or at least 6 cm, radially outwardly from the spout rotation axis (i.e. over said distance Q), allowing a relatively high moment and resulting high torque at a relatively low user pressure/force when operating the handle.

The spout unit 3 preferably includes an outlet channel 34 for conveying product to a product outlet 35 of the spout unit 3, wherein the outlet channel 34 extends substantially in the direction in which the handle 4 extends.

In this way, a compact and efficient configuration is provided, wherein the advantages of spouting product at a distance from a side of the product container and providing a lever for rotating the spout unit are combined in a compact way.

In an embodiment according to the invention, the product discharge device 2 includes a seal unit 5 which is configured to enter an opened state (see FIGS. 8b, 11b) from a sealed state (see FIGS. 8a, 11a), wherein, in the sealed state, the seal unit 5 is configured to substantially airtightly close off the first product flowthrough channel 6 of the discharge device 2. In the opened state, the seal unit 5 is configured to allow a flow of product through the first product flowthrough channel 6 (i.e. the seal unit 5 does not seal the channel 6 anymore). In the present embodiment, the discharge device 2 is configured such that the seal unit 5 is brought from the sealed state to the opened state by rotating the spout unit 3 from the first position to the operational position.

Thus, a number of user actions may be reduced and a user friendly, efficient and robust solution for bringing the seal unit 5 to the opened state can be provided.

To provide further improvements of these aspects, in particular to limit the possibility of failures during transport and use, the discharge device 2 may be configured such that an angular position of the spout unit 3 about the spout rotation axis K is substantially limited to the angular positions ranging from the first position up to and including the operational position.

The discharge device 2 may be configured such that when the spout unit 3 is in the operational position, the position of the spout unit 3 is substantially fixed in the operational position, to prevent that a discharge device 2 wherein the seal unit 5 is opened may be visually confused for a device 2 wherein the seal unit is in the sealed state. This can help to further improve safe handling of the product, in particular to improve food safety.

The discharge device 2 may be configured to provide user feedback, preferably haptic user feedback, upon the spout unit 3 leaving the first position, wherein, preferably, the discharge device 2 is further configured to provide user feedback, preferably haptic user feedback, upon the spout unit 3 reaching the operational position.

Such user feedback can provide additional ease of use and safety by guiding the user in proper usage of the device 2.

It will be appreciated that the above mentioned limitation of angular positions, fixing in the operational position and providing haptic feedback may be realized in various ways through appropriate blocking and/or resisting structures in the discharge device 2, which are not explicitly shown in the drawings.

The discharge device 2 may be configured to convert a rotation of the spout unit 3, from the first position to the operational position, to a respective translation of a follower element 8 (which, in some embodiments, may be a plug 10, see FIGS. 8a-b), wherein the seal unit 5 is configured to enter the opened state, from the sealed state, by the translation of the follower element 8, 10, wherein a direction T of the translation of the follower element 8, 10 preferably extends substantially radially outwardly from the spout rotation axis K.

Such a configuration can provide a robust and simple solution for converting a rotation to a translation, wherein the translation may affect the opening of the seal unit 5.

The spout unit may include a cam 9, in particular a disk cam 9, for bringing the seal unit 5 from the sealed state to the opened state, wherein the cam 9 is rotatable about the spout rotation axis K by a rotation of the spout unit 3 about the spout rotation axis K.

Figure 8B:
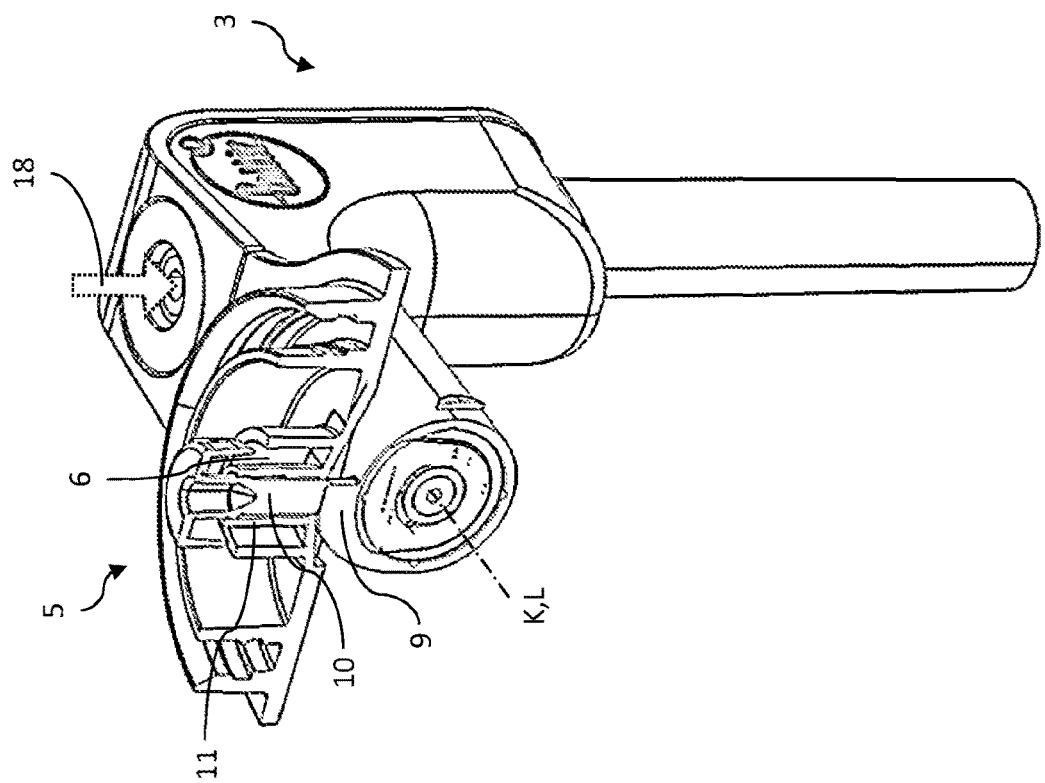
FIG. 8b shows an opened view similar to FIG. 8a, wherein the spout unit is in an operational position.
Figure 8A:
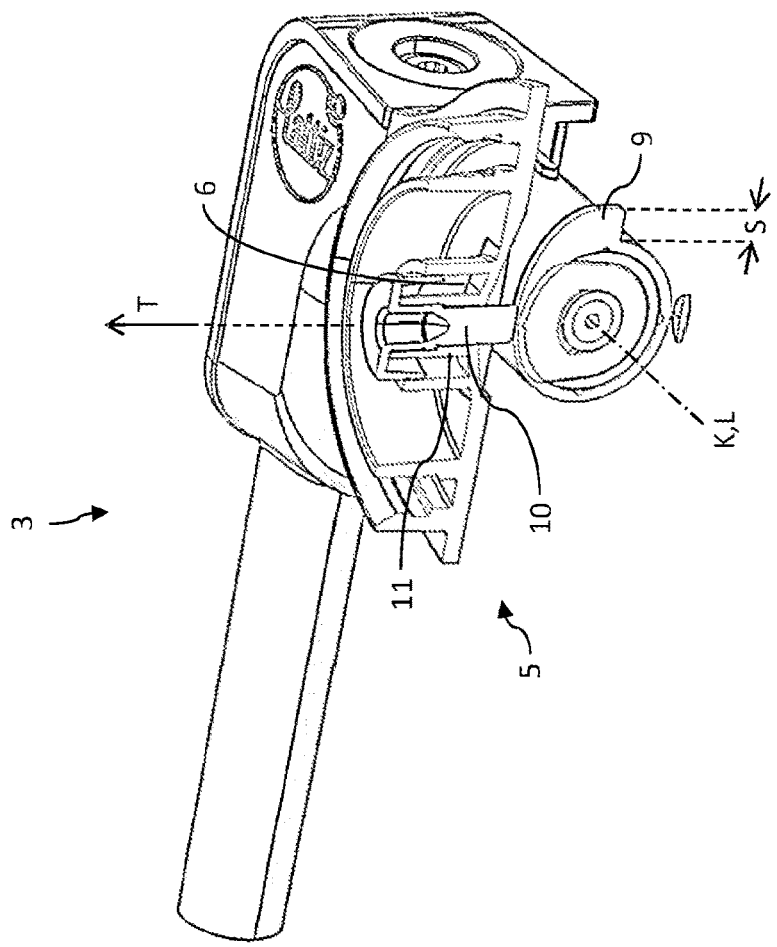
FIG. 8a shows an opened view of a product discharge device including a follower element along the line VIII-VIII in FIG. 7, wherein a spout unit is in a first position.

As shown in FIGS. 8a-b and 11 a-b, the discharge device 2 may be configured such that the cam 9 engages the follower element 8, 10 for bringing the seal unit 5 from the sealed state to the opened state.

In this way, a relatively simple and robust transmission is provided.

Two exemplary embodiments according to the invention differ at least in their configuration of the seal unit 5.

Figure 9B:
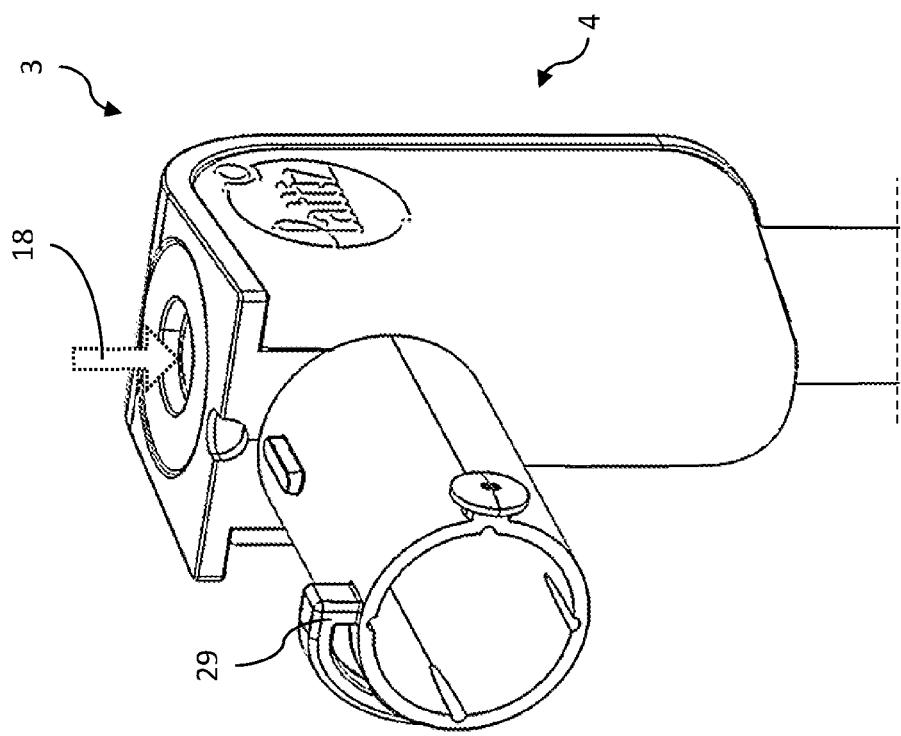
Figure 9A:
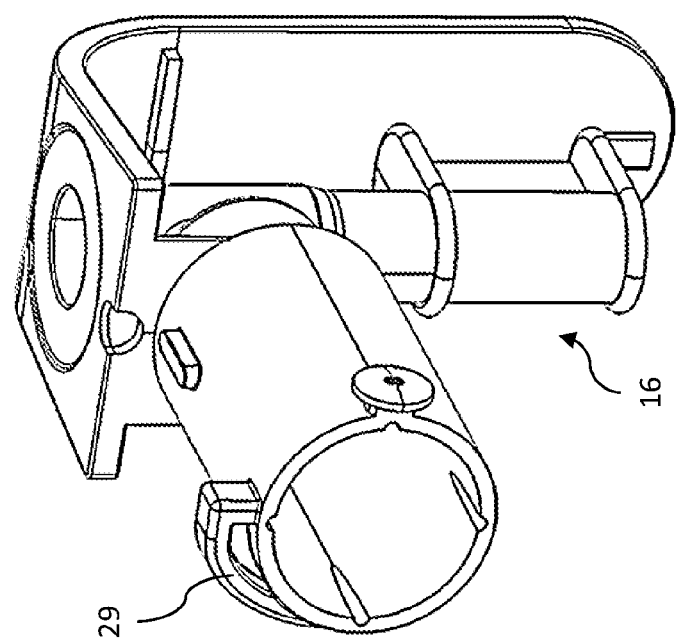
Figure 10B:
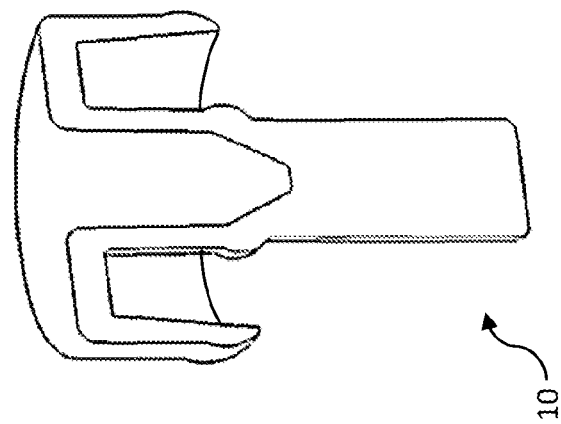
Figure 10A:
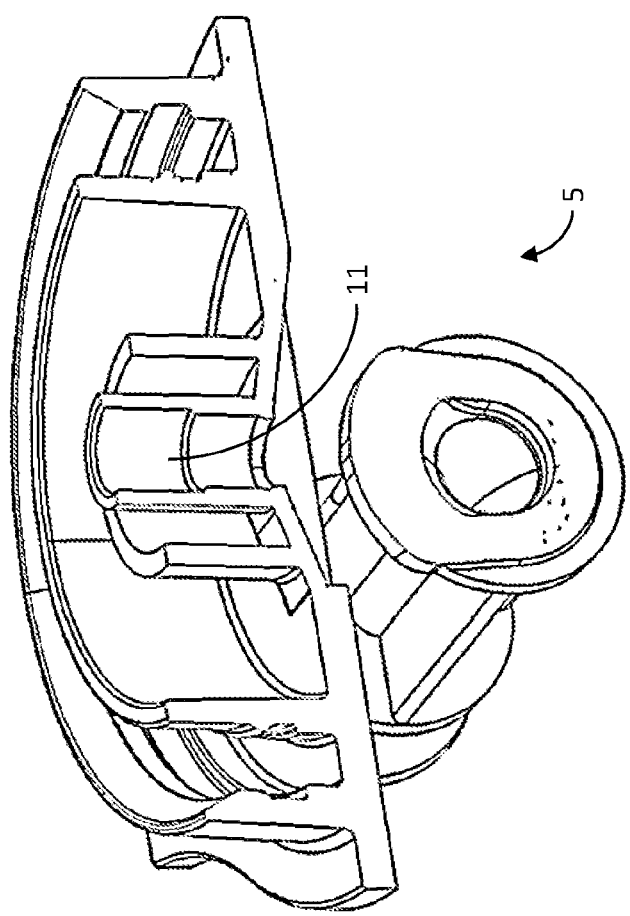
FIG. 10a shows an opened view of a seal unit according to an embodiment, wherein a plug of the seal unit is not shown.
Figure 12B:
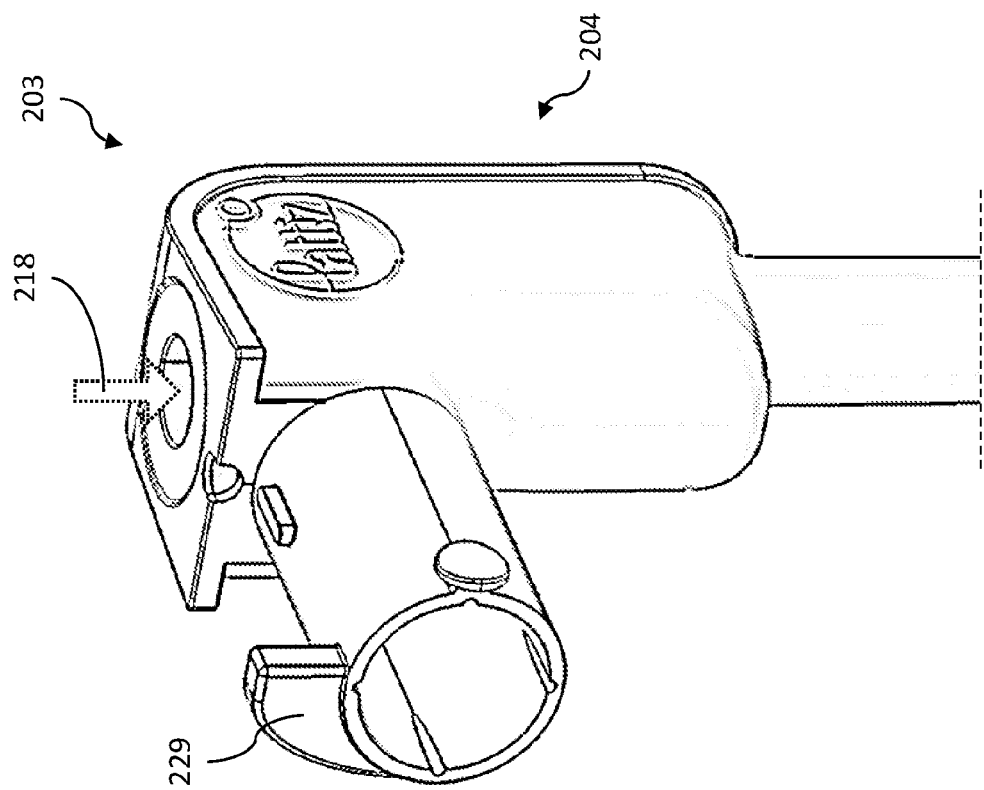
Figure 12A:
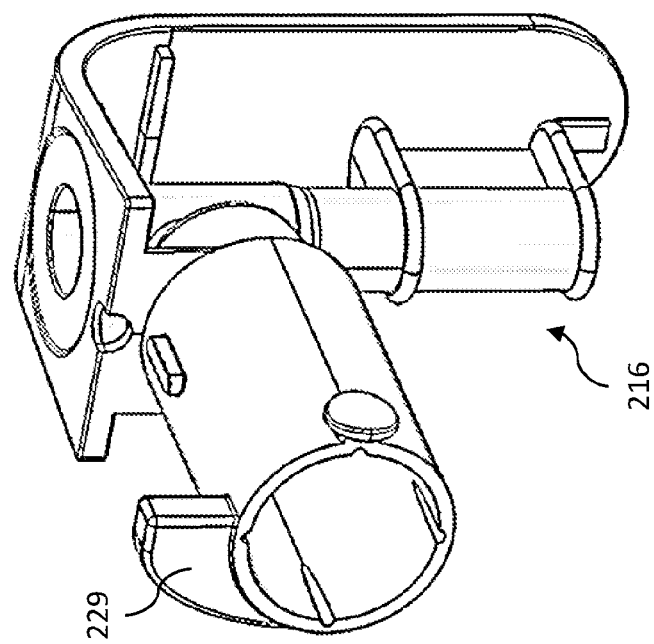
Figure 13:
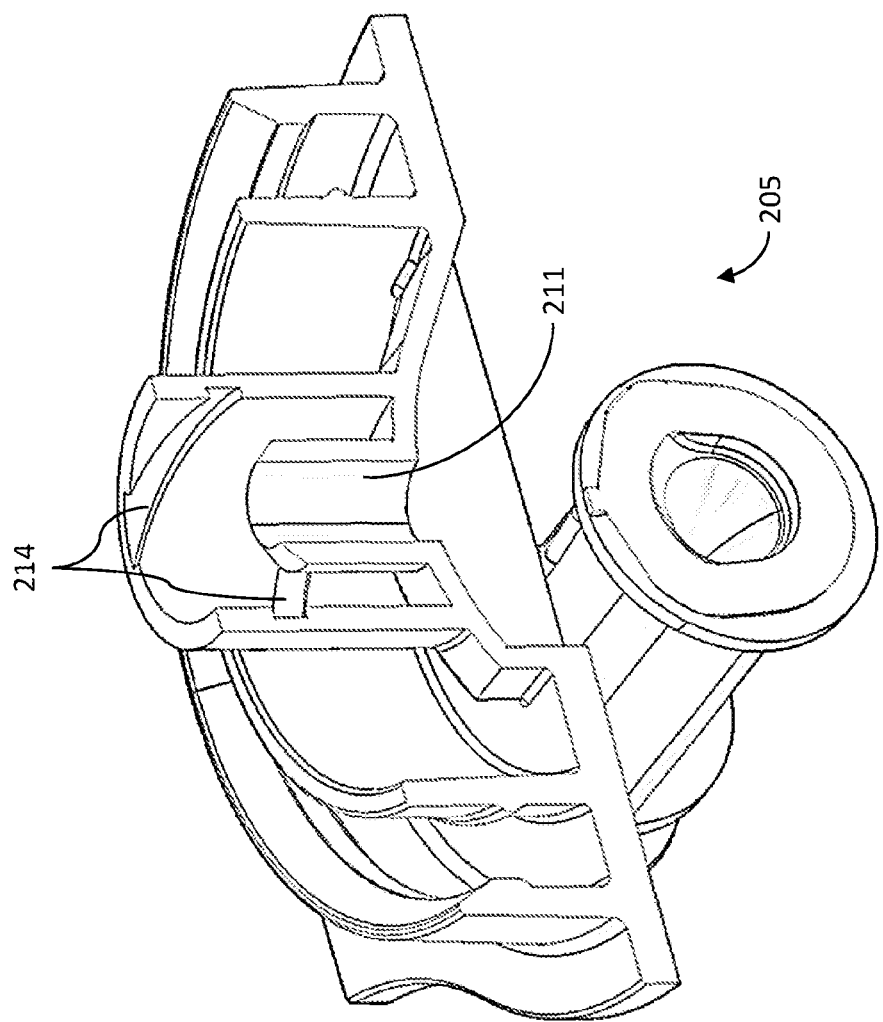
FIG. 13 shows an opened view the seal unit of FIG. 11a, wherein a follower element and a cutter of the seal unit are not shown.
Figure 14B:
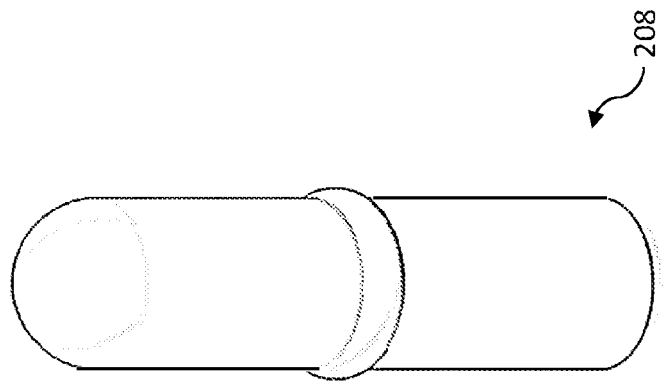
Figure 14A:
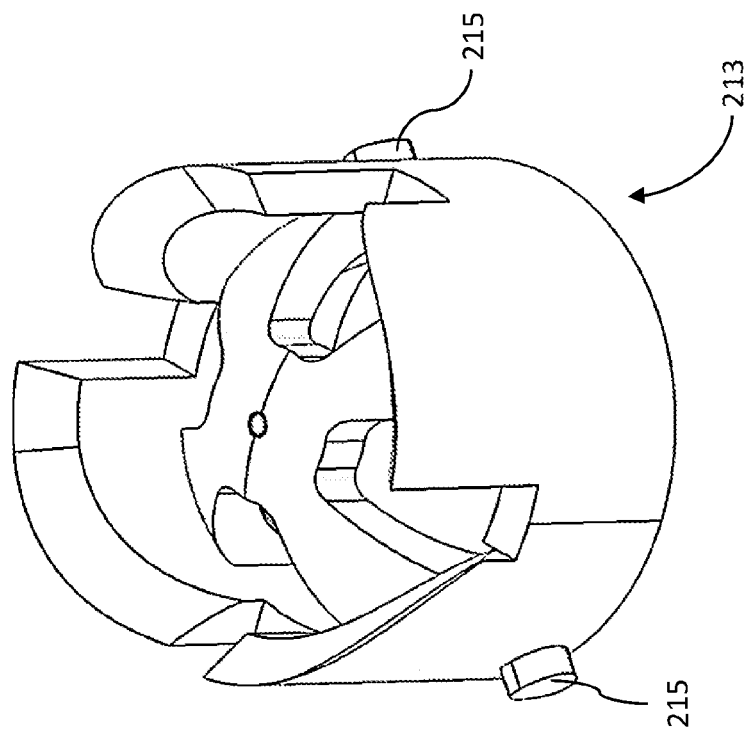

In a first of such exemplary embodiments, as shown in FIGS. 8-10, the seal unit 5 includes a plug 10 which may also act as the follower element (although this is not strictly necessary). In the sealed state, the plug 10 is received by a shaft 11 of the seal unit 5 to substantially airtightly close off the first product flowthrough channel 6 of the outflow device 2, wherein the seal unit 5 is configured such that the plug 10 is at least partially removable from the shaft 11 to bring the seal unit 5 to the opened state. In this embodiment, the cam 9 of the spout unit 3 preferably has a stroke S of between 1 and 6 mm, preferably between 2 and 4 mm, for example about 3 mm.

Advantageously, in such an embodiment, a simple and robust solution is provided wherein a reliable seal unit can be easily manufactured, e.g. using injection molding.

In a second of such exemplary embodiments, as shown in FIGS. 11-14, the seal unit 205 includes a cuttable seal material 212, for example including aluminium and/or a plastic, preferably including a layer of aluminium and a layer of PET (poly-ethylene terephthalate), for substantially airtightly closing off the first product flowthrough channel 206 of the discharge device 202, wherein the seal unit 205 includes a cutter 213 for cutting the seal material 212, wherein the seal unit 205 is configured such that the cutter 213 is cuttingly movable through the seal material 212, for example by the translation of the follower element 208. In this embodiment, the follower element 208 is preferably configured to engage the cutter 213, wherein the cam 209 of the spout unit preferably has a stroke S of between 2 and 10 mm, preferably between 4 and 8 mm, for example about 6 mm.

In such an embodiment, advantageously, good sealing solution is combined with user friendly and reliable means for opening, i.e. breaking the seal, i.e. the cuttable seal material.

In the said second exemplary embodiment, the follower element 208 may be at least partially received in a shaft 211, wherein the discharge device 202, in particular the seal unit 205, is configured to convert an actuation of the cutter 213, e.g. received from the spout unit 203, to a substantially helical movement of the cutter 213, wherein the seal unit includes an engaging structure 214 for engaging with a respective engaging structure 215 of the cutter 213, wherein at least one of the mutual engaging structures 214, 215 includes a substantially helical profile, e.g. a spindle thread or the like, for restricting a movement of the cutter 213 to a substantially helical movement.

The helical movement of the cutter can ensure a smooth and substantially complete cutting of the cuttable material (as opposed to for example a puncturing or tearing of the material).

With reference to FIGS. 15a-b, the discharge device 2 may be provided with a transport lock 30 which is configured to block a rotation of the spout unit 3 by engaging, e.g. clamping, a respective receiving structure 31 of the spout unit 3, to prevent that the seal unit 5 is accidentally brought to the opened state. The transport lock 30 may be further configured to block a movement of the valve member 24. To this end, the transport lock 30 may be provided with a valve member engaging structure 32. The transport lock 30 is preferably manually removable, e.g. pullable, from the discharge device 2 by a user.

Such a transport lock may thus provide additional protection of the discharge device during transport.

Thus, there is provided an improved product container, in particular for a food product, wherein the container can be used efficiently, easily, safely and reliably by a user, wherein product can be spouted substantially at a distance from a side of the container, wherein the container can be transported compactly and wherein a product contained in the container may be protected from environmental threats such as bacteria.

While the invention has been explained with reference to exemplary embodiments, it will be appreciated that the invention may be carried out using variations and alternatives that fall within the scope of the claims.

For example, the rotation of the spout unit may be converted to an opening of the seal unit through other means than those described above, for example using a gear, for example in a rack-and-pinion configuration or using crossed helical gears.

The discharge device may or may not include a microfiltration device and may or may not include a mixing device.

The product P can comprise, for instance, an edible or non edible protein, a protein mixture or protein solution. An edible protein solution can comprise, for instance, a milk protein, a whey protein and casein, egg white proteins, yeast isolate, soy protein, hemoglobin, vegetal protein isolate, meat protein, collagen, gelatin and the like.

The product may be, for instance, homogeneously or non homogeneously foamed.

The product can be a food product, or a cosmetic product, a cleaner and/or a different type of product.

The product can further contain various substances, for instance, a thickener, coloring, flavoring and the like.

Furthermore, the product is, in particular, a food, for instance, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream, dessert or the like. The product can further comprise, for instance, vegetal or animal fat or oil, a thickener, sugar, sweeteners, flavoring, coloring and/or the like, and/or various other ingredients, which will be clear to the skilled person. The product can also comprise, for instance, a non-consumable product, a body care product, a hair treating agent, or the like.

Further, the dispensed product can be, for instance, a hot product. To this end, the product, before being placed in the container, may already be heated with means known for that purpose (e.g., microwave, steam, electric, convection, or other means). Also, the method and the system according to the invention may utilize or be provided with, for instance, heating means (for instance, a heating system), to heat the product.

According to a further elaboration, heating of the product is carried out upstream with respect to the microfiltration device, for instance, by supplying heat to and/or into the product container 1, and/or by heating product at a location between the product container and the microfiltration device. This heating may be, for instance, between 20° C. and 90° C., preferably between 40° C. and 75° C. Furthermore, product heating may be carried out downstream with respect to the microfiltration device, for instance, in and/or upstream with respect to an outflow line 66. The heating means can be designed, for instance, to heat product flowing through the product discharge means 6, and/or to heat gas to be supplied to the product, and/or to heat an optional mixing device and/or a microfiltration device, and the like. According to a further elaboration, the heating means may be designed, for instance, to bring the microfiltration device to a temperature that is suitable for heating (i.e., increasing the temperature) of the product flowing past. According to a further elaboration, the heating means may be designed to bring a processing device or product processing unit to a temperature that is suitable for heating the product flowing past.

In addition, the method (and the system) can utilize at least two product flows (two product parts), where a first product part is foamed by a present method (and the system, respectively) and then combined (by the method and the system, respectively) with a second, non-foamed product part (and, for instance, is mixed therewith). The product discharge means or product processing unit may be provided with a branch, to provide, from this branch, a first product flow and a second product flow separate therefrom. The first product flow is then foamed, and thereupon combined again with the second product flow (and, for instance, mixed therewith). In product heating, there may be heated, for instance, a first product stream as mentioned, or, conversely, a second product stream as mentioned, or both.

Further, should a downstream mixing device be present in the product processing unit, preferably static means are utilized, for instance, a static microfiltration filter and an optionally static membrane. In an alternative embodiment, for instance, a moving filter (and/or optionally dynamic membrane) can be utilized.

The present invention (method and system) may be used to provide various products, for instance, milk, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream, dessert, or other products.

The invention can prepare hot pourable foams, for instance, cappuccino, latte macchiato, chocolate drinks, and other hot (milk) drinks, with or without flavor additions. In addition, non-dairy drinks can be prepared, or products that are intended for consumption. In a further elaboration, to that end, the product is foamed to a minimum overrun of 10%, and obtains/has immediately after dispensing a temperature between 20 and 90° C., preferably between 40 and 70° C. The product may be, for instance, predominantly pourable (for instance, with an overrun lower than 100%). The heating means mentioned can be used to dispense warm pourable product. The pourable product may be obtained, for instance, by combining a non-foamed product part and a foamed product part.

Alternatively, the invention can prepare cold and ice-cold drinks, for instance, milk drink, milk shake, chocolate drink, lunch drink, yoghurt drink, fruit drink, alcohol-containing drink such as beer or wine, etc. In that case, the product can have, for instance, a minimum overrun of 10%, and a temperature lower than 20° C., preferably a temperature between −5 and 10° C. The cold, dispensed product may be predominantly pourable, and can comprise a sweet or, conversely, a salty product, a fermented milk product, juice, or other product.

Furthermore, the invention can be used to provide hot and cold foamed sauces, for instance, a sweet sauce, sour sauce, salty sauce and/or other sauce. Such a sauce obtained by means of the invention can have a minimum overrun of 1%, and a temperature in the range of from −20° C. to 80° C.

A dessert prepared by means of the invention, for instance, a mousse, vla or yoghurt, can have a minimum overrun of 10%, and, for instance, a temperature of 1° C. to 40° C. (preferably a temperature lower than 10° C.). Spray cream is a specific use where cream is realized that has a higher overrun (preferably higher than 300%) and improved stability over conventional products.

The invention is particularly well-suited to prepare ice cream or a (milk) shake. The ice cream or (milk) shake product can have an overrun in the range of 10%-200%, and a temperature of 0° C. or lower (preferably a temperature in the range of −10° C. to −2° C.).

The invention (method, system, or both) can be used, for instance, such that a product mentioned undergoes an overrun that is greater than 100% (in particular approximately 150% or more, and more particularly approximately 200% or more), utilizing a relatively low pressure (in particular a pressure of gas supplied to a gas supply space mentioned), for instance, a pressure lower than 2 bar. The invention (method, system, or both) can be used, for instance, such that a product mentioned undergoes an overrun that is greater than 100% (in particular approximately 150% or more, and more particularly approximately 200% or more), while the dispensed product has a relatively low temperature, for instance, a temperature of approximately 0° C. or lower.

Furthermore, the invention (method, system, or both) may be so configured that the product P downstream of the microfiltration device does not undergo any mixing treatment, and does not undergo any controlled pressure reduction. For example, as the product semi-skimmed milk or a concentrate thereof can be used. Also other products can be treated according to a method (and/or by a system) so configured that the product P downstream of the microfiltration device does not undergo any mixing treatment, and does not undergo any controlled pressure reduction, for instance, a food product, cream, cappuccino milk, spray cream, (fruit) juice/drink, an alcohol-containing drink or drink base, for instance, beer or wine, a dairy or dairy-based drink, for instance, a whey drink or permeate-based drink, (milk) shake, chocolate drink, (drinking) yoghurt, sauce, ice cream or dessert, in particular a dairy product, or a product not intended for consumption.

According to a preferred embodiment, as follows from the above, the system is not provided with a processing device downstream with respect to the microfiltration device 16 (so that the system performs no mixing treatment and no pressure reduction treatment on the product provided with gas). In an alternative embodiment, however, such an additional downstream processing device is provided in the system.

Besides, the product processing unit 2 can include a plurality of microfiltration devices 16, e.g. including at least two or more tubular microfiltration elements 20 in respective processing spaces, to increase throughput.

LIST OF REFERENCE SIGNS

1. Product container
2, 202. Product discharge device
3, 203. Spout unit
4, 204. Handle
5, 205. Seal unit
6, 206. First product flowthrough channel
7. Second product flowthrough channel
8, 208. Follower element
9, 209. Cam
10. Plug
11. Shaft
212. Cuttable material
213. Cutter
214. Engaging structure of seal unit
215. Engaging structure of cutter
16. Microfiltration device
17. Product entrance of microfiltration device
18, 218. Fluid (gas) supply
19. Processing device
20. Filtration wall
21. Mixing device
22. Diluent supply
23. Flow constriction
24. Valve member
25. Diluent flowthrough channel
26. Product dispensing system
27. Valve actuator
28. Receptacle
29, 229. Diluent supply connector
30. Transport lock
31. Transport lock engaging structure of spout unit
32. Valve member engaging structure of transport lock
33. Profiled surface of handle
34. Outlet channel of spout unit
35. Product outlet of spout unit
F. Product flow direction
P. Product
K. Spout rotation axis
L. Central axis of second product flowthrough channel
M. Dispensing machine
S. Stroke of cam
T. Direction of translation of follower element

The invention claimed is:

1. A product container comprising a product discharge device for releasing product from the container, the discharge device comprising:
   a spout for product discharge, wherein the spout is rotatable about a spout rotation axis, from a first position to an operational position; and
   a seal which is configured to enter an opened state from a sealed state, wherein, in the sealed state, the seal is configured to airtightly close off a first product flowthrough channel of the discharge device, wherein, in the opened state, the seal is configured to allow a flow of product through the first product flowthrough channel, wherein the discharge device is configured such that the seal is brought from the sealed state to the opened state by rotating the spout from the first position to the operational position, and wherein the discharge device is configured to convert a rotation of the spout from the first position to the operational position, to a respective translation of a follower, wherein the seal is configured to enter the opened state from the sealed state by the translation of the follower, and wherein a direction of the translation of the follower extends radially outwardly from the spout rotation axis.

2. The product container according to claim 1, wherein the spout comprises a handle for rotating the spout from the first position to the operational position.

3. The product container according to claim 2, wherein the spout comprises an outlet channel for conveying product to a product outlet of the spout, wherein the outlet channel extends in the direction in which the handle extends.

4. The product container according to claim 1, wherein the spout rotation axis coincides with a central axis of a second product flowthrough channel of the discharge device, which is downstream of the first product flowthrough channel.

5. The product container according to claim 1, wherein the first position of the spout and the operational position of the spout differ by an angle of rotation about the spout rotation axis of between 10 and 275 degrees.

6. The product container according to claim 1, wherein the spout comprises a cam for bringing the seal from the sealed state to the opened state, wherein the cam is rotatable about the spout rotation axis by a rotation of the spout about the spout rotation axis.

7. The product container according to claim 6, wherein the cam is a disk cam.

8. The product container according to claim 6, wherein the discharge device is configured such that the cam engages the follower element for bringing the seal from the sealed state to the opened state.

9. The product container according to claim 6, wherein the discharge device is configured such that the cam engages the plug for bringing the seal from the sealed state to the opened state.

10. The product container according to claim 6, wherein the cam of the spout has a stroke of between 1 and 6 mm.

11. The product container according to claim 1, wherein the seal comprises a plug, which, in the sealed state, is received by a shaft of the seal to airtightly close off the first product flowthrough channel of the discharge device, wherein the seal is configured such that the plug is at least partially removable from the shaft to bring the seal to the opened state.

12. The product container according to claim 1, wherein the seal comprises a cuttable seal material for airtightly closing off the first product flowthrough channel of the discharge device, wherein the seal comprises a cutter for cutting the seal material, wherein the seal is configured such that the cutter is cuttingly movable through the seal material.

13. The product container according to claim 12, wherein the seal is configured such that the cutter is cuttingly movable through the seal material by the translation of the follower.

14. The product container according to claim 1, wherein the discharge device is configured to convert an actuation of the cutter to a helical movement of the cutter, wherein the seal includes an engaging structure for engaging with a respective engaging structure of the cutter, wherein at least one of the mutual engaging structures includes a helical profile.

15. The product container according to claim 1, wherein the spout comprises a microfiltration device which is provided with a product entrance for supply of product, wherein the microfiltration device is connectable to a fluid supply for supplying gas to the product during product discharge.

16. The product container according to claim 15, wherein the spout comprises a processing device, which is arranged downstream of the microfiltration device, for performing a mixing treatment or pressure reduction treatment on the product provided with gas.

17. The product container according to claim 15, wherein the spout comprises the microfiltration device provided with a filtration wall with gas transmissive pores having a pore size in the range of 0.1-10 microns, and a length of at most 5 cm, measured in a product flow direction of product during use flowing along that wall, parallel to that wall.

18. The product container according to claim 1, configured to be exchangeably received by a dispensing machine.

19. The product container according to claim 15, wherein the discharge device comprises a mixing device upstream of the microfiltration device, wherein the mixing device is configured to mix a diluent into the product, wherein the mixing device is connectable to a diluent supply for receiving the diluent.

20. The product container according to claim 19, wherein the mixing device is configured such that supplying the diluent to the mixing device causes product to be pumped into the mixing device.

21. The product container according to claim 19, wherein the mixing device comprises a flow constriction in a flow path of the diluent to form an aspirator pump for pumping product into the mixing device.

22. The product container according to claim 19, wherein the mixing device comprises a valve member for selectively blocking a flow of product into the mixing device, wherein the valve member is movable between a blocking state, wherein a flow of product is blocked, and a passage providing state, wherein a passage for flow of product into the mixing device is provided.

23. The product container according to claim 22, wherein the valve member comprises a diluent flowthrough channel for conveying a flow of diluent through the valve member or the valve member is connectable to the diluent supply.

24. The product container according to claim 1, wherein the spout comprises a handle for rotating the spout from the first position to the operational position, wherein the handle extends more than 1 cm radially outwardly from the spout rotation axis.

25. The product container according to claim 1, wherein the discharge device is configured such that an angular position of the spout about the spout rotation axis is limited to angular positions ranging from the first position up to and including the operational position.

26. The product container according to claim 1, wherein the discharge device is configured such that when the spout is in the operational position, the position of the spout is fixed in the operational position.

27. The product container according to claim 1, wherein the discharge device is provided with a transport lock which is configured to lock the spout in the first position.

28. The product container according to claim 1, wherein the discharge device is configured to provide user feedback upon the spout leaving the first position.

29. The product container according to claim 28, wherein the discharge device is further configured to provide user feedback upon the spout reaching the operational position.

* * * * *